UNITED STATES PATENT OFFICE.

HERMANN GUSSMANN, OF HÖCHST-ON-THE-MAIN, GERMANY, ASSIGNOR TO THE FARBWERKE, VORMALS MEISTER, LUCIUS & BRÜNING, OF SAME PLACE.

BLUE SULFUR DYE.

SPECIFICATION forming part of Letters Patent No. 660,770, dated October 30, 1900.

Application filed May 12, 1900. Serial No. 16,497. (Specimens.)

*To all whom it may concern:*

Be it known that I, HERMANN GUSSMANN, Ph. D., a citizen of the Empire of Germany, residing at Höchst-on-the-Main, Germany, have invented certain new and useful Improvements in the Manufacture of a Blue Sulfurized Dyestuff, of which the following is a specification.

I have found that a blue dyestuff for cotton of great fastness may be obtained if para-amido-para-oxydiphenylamincarboxylic acid

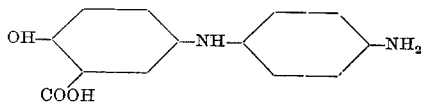

obtained by heating para-amido-para-oxydiphenylaminsulfocarboxylic acid

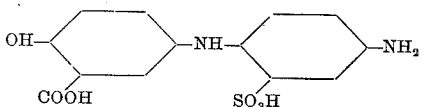

with dilute acids under pressure be heated together with sulfur and sulfids of alkali metals.

The process may be illustrated as follows: Thirty parts, by weight, of para-amido-para-oxydiphenylamincarboxylic acid are introduced at about 140° centigrade into a melted mixture of one hundred parts of sodium sulfid and forty parts of sulfur and heated to from 160° to 200° centigrade till the mixture, at first strongly effervescing, becomes calm and begins to solidify. The mixture is then dissolved in water and the green solution is acidified with dilute sulfuric or hydrochloric acid, when the dyestuff in form of its leuco compound mixed with sulfur separates as a reddish-brown precipitate. The filtered precipitate is treated with sodium carbonate, when the leuco compound alone is dissolved, and this solution is oxidized by blowing in air. The dyestuff is thus completely precipitated. When filtered from the liquid, dried, and pulverized, it is a dark powder of metallic luster, soluble with difficulty in water, soluble in concentrated sulfuric acid, yielding a dark-blue solution. Reducing agents reconvert the dyestuff into its leuco compound. The dyestuff dyes cotton blue. Instead of the above-mentioned amido compound the corresponding nitrocarboxylic acid may be employed with the same result. This nitrocarboxylic acid is obtained from nitro-oxydiphenylaminsulfocarboxylic acid by elimination of the sulfonic group, as indicated above, for the amidocarboxylic acid.

Having now described my invention, what I claim is—

1. The herein-described process for the manufacture of a blue sulfurized dyestuff, which consists in heating para-amido-para-oxydiphenylamincarboxylic acid

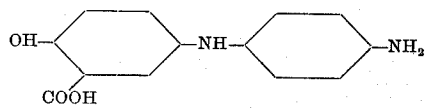

with sulfur and sulfids of alkali metals and oxidizing the leuco compound thus obtained, substantially as described.

2. As a new product, the blue sulfurized dyestuff as herein described, being, when dry and pulverized, a dark powder of metallic luster, soluble with difficulty in water, soluble in sulfuric acid with a blue coloration, reducing agents reconverting the dyestuff into its leuco compound, the dyestuff dyeing cotton blue, substantially as described.

In testimony that I claim the foregoing as my invention I have signed my name in presence of two subscribing witnesses.

HERMANN GUSSMANN.

Witnesses:
ALFRED BRISBOIS,
JOHANN HARTENSTEN.